May 12, 1925.
R. CHILTON ET AL
PISTON
Filed Oct. 26, 1923
1,537,525
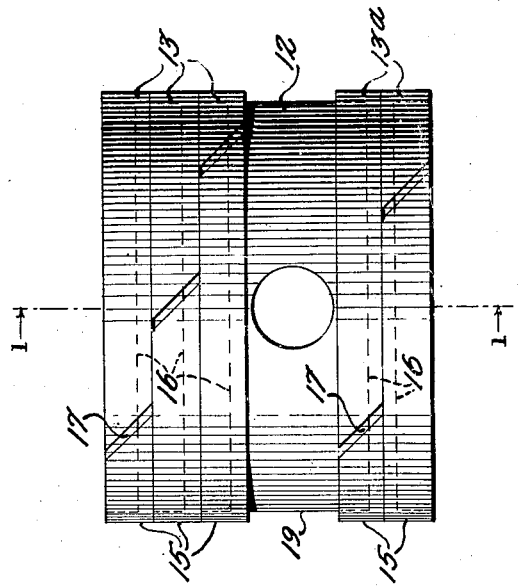
*Fig. 3.*
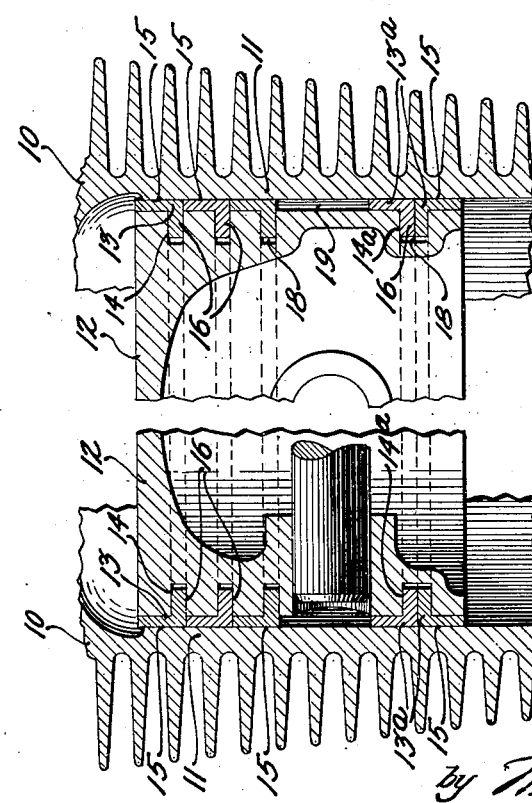
*Fig. 2.*
*Fig. 1.*
INVENTORS
ROLAND CHILTON
HAROLD H. YOUNG
ATTORNEY Patented May 12, 1925.

1,537,525

UNITED STATES PATENT OFFICE.

ROLAND CHILTON AND HAROLD H. YOUNG, OF KEYPORT, NEW JERSEY, ASSIGNORS TO AEROMARINE PLANE & MOTOR COMPANY, A CORPORATION OF NEW YORK.

PISTON.

Application filed October 26, 1923. Serial No. 670,833.

*To all whom it may concern:*

Be it known that we, ROLAND CHILTON, a subject of the King of England, and HAROLD H. YOUNG, a citizen of the United States, and both residents of Keyport, in the county of Monmouth and State of New Jersey, have invented certain new and useful Improvements in Pistons, of which the following is a specification, reference being had to the accompanying drawings, forming part of this specification.

This invention applies to pistons in general, and more specifically to pistons for use in connection with air-cooled explosion engines or other types where cylinders of aluminum or other relatively soft alloys are desired. The primary object of this invention is to permit the use of such light and soft alloys for the cylinders without necessarily providing for a steel liner to the cylinder for the piston to run on. Such liners are disadvantageous in that they increase the weight and detract from the thermal conductivity which is an especially serious consideration in air-cooled engines.

In aircraft engines, and especially in the air-cooled type, high thermal conductivity from the center of the pistons to the air-cooling fins is of primary importance, and for this reason pistons of aluminum or other high conductivity alloy are regarded as essential. Experience has developed aluminum alloys which have excellent bearing qualities when run against steel sleeves, but it has been found impracticable to have any bearing with both its elements of aluminum alloy. The prior art shows various means of providing attached slippers or skirts to constitute a steel or other bearing surface for an aluminum piston against a cylinder. The present invention contemplates the use of the piston rings themselves as the bearing surface of the piston and to this end a special and improved form of ring is herein disclosed, which is adapted to bear directly against the cylinder walls and to afford an efficient long-wearing bearing surface for the support of the piston.

Experience has proved that in the case of conventional pistons most of the heat passing from the piston to the cylinder walls does so through the rings. One of the objects of this invention is to obtain the maximum possible area of ring in contact with both the wall and with the piston and to obtain improved thermal contact between the piston and the ring as set forth hereinafter.

A further object of this invention is to prevent wear of the relatively soft cylinder walls from the scraping action of the piston rings by providing a relatively broad surface on the ring in contact with the cylinder.

One of the objections to the use of steel cylinders with aluminum pistons is that the expansion of the latter metal under heat is so relatively great that large clearances between the cylinder and the piston must be provided. The present invention contemplates a construction whereby much smaller clearances can be used since both the cylinder and piston may be made of the same material, the only different material entering the construction being the rings which are split to allow of expansion in the conventional way.

Experience has shown that even with conventional construction the friction of the rings and the cylinder may generate sufficient side pressure to cause side wear of the rings in their slots. Such friction will be considerably increased in the present disclosure where the rings are subject to a side pressure from the piston. The rings accordingly are preferably made of special section so that each ring has a large bearing surface in contact with both the cylinder wall and in the grooves in the piston. In this invention there will be no contact of piston material itself with the cylinder wall and the rings are accordingly preferably disposed so as to abut each other whereby the maximum amount of bearing surface on the cylinder is obtained in the minimum piston length. At the same time the shape of the rings affords adequate metal in the piston between adjacent ring grooves.

Contrary to conventional practice where the piston is supported directly on the cylinder walls and a radial clearance is allowed between the inner diameter of the piston ring and the bottom of its groove, in the present invention the piston ring is made to fit the piston on the inside diameter of the band forming the head of the ring section whose outer diameter is in contact with the walls. Clearance may be conveniently provided at the bottom of the groove which receives the central projection of the section.

To these and other ends, the invention consists in certain improvements and the combination and arrangement of parts, all as will be more fully hereinafter described, the features of novelty being pointed out particularly in the claims at the end of the specification.

In the drawings:—

Figure 1 is a fragmentary vertical section of an air-cooled cylinder and its piston, said section being taken on the line 1—1 of Fig. 3.

Figure 2 is a fragmentary vertical section of a cylinder and piston taken substantially central and transversely of axis of the wrist pin bearing.

Figure 3 is an exterior elevational view of the improved piston in detail.

In the present instance, 10 designates the air-cooled cylinder of an internal combustion engine having walls 11. A piston 12 is disposed within the cylinder and is provided with a plurality of rings 13 supported in the grooves 14 of the piston and bearing against the walls 11 of the cylinder.

The rings 13 are preferably so formed in cross section as to provide a relatively broad peripheral bearing portion 15 in contact with both the cylinder walls 11 and with the piston 12. An inwardly extending portion 16 formed integral with the part 15 is adapted to fit into the grooves 14. The rings are conveniently disposed on the piston as abutting one another so as to provide as large an uninterrupted area of contact with the walls of the cylinder as practical, in a given length, also they are split in the conventional way as at 17 to permit of expansion and a clearance 18 is provided between the bottom of the grooves and the portion 16 of the rings.

As shown in the present disclosure the rings are formed substantially L shaped in cross section, said rings may however conveniently be constructed of a form other than that shown, such as T or U shaped.

The cylinder 10 with its walls 11, and the piston 12 are both preferably formed of alloys having high heat conducting characteristics whilst the rings 13 may be constructed of relatively hard or ferrous metal.

It will be seen that the only means of contact between the piston proper and the cylinder walls is through the rings 13 ample clearance being provided on the portions of the piston not covered by the rings as at 19. As shown on the lower portion of the piston, a pair of rings 13ª are supported in a single groove 14ª whereas the rings on the upper portion of the piston are supported in individual grooves, the variation as shown is simply a matter of convenience, the manner of their disposition being primarily to have the rings abut one another so as to form a broad bearing contacting both with the piston and the cylinder.

Attention is called to the fact that the present embodiment permits of comparatively light cylinder and piston construction fabricated of aluminum or other alloys.

Variations may be resorted to within the scope of the invention and portions of the improvements may be used without the others whilst not departing from the spirit of the invention.

Having thus described our invention, we claim,

1. In an internal combustion engine, in combination, a piston, a cylinder, split rings arranged on the piston in contiguous relation and constituting an upper and lower bearing means for the lateral support of the piston within the cylinder, each ring being in one piece and comprising as to its cross section a pair of integral rectangular portions adapted the one to contact on its periphery with the cylinder and with its inside circumference with the piston and the other to engage with suitable slots in the piston.

2. In the art of guiding a piston for reciprocation within a cylinder, in combination, a piston having a wrist pin bearing and circumferential grooves spaced apart thereon on either side of said bearing, rings having groove-fitting extensions integral with a cylindrical portion adapted to fill the space on the periphery of the piston between the spaced-apart grooves and to afford a bearing means for the piston upon the cylinder.

3. In combination, an aluminum cylinder, a piston, a plurality of relatively hard rings each having an annular cylindrical portion adapted to slide on the cylinder for the lateral support of the piston and an integral fin portion extending radially inwardly from the cylindrical portion set forth and fitting a groove in the piston.

4. In an engine, the combination of, a piston, series of abutting rings forming upper and lower spaced apart sleeve portions fitting between the cylinder of the engine and the periphery of the piston, said rings providing the sole support of the piston for reciprocation within the cylinder, each ring having an annular inwardly extending portion fitting a groove in the piston.

5. In an engine, the combination of, a cylinder and a piston each of relatively light material having uncommonly high thermal conductivity, the piston of such size as to provide an annular space between the piston and the cylinder, spaced apart circumferential grooves formed upon the piston, split annular members each comprising a peripheral band portion adapted to fit between the grooves the space set forth for the support of the piston for reciprocation within the cylinder and having an integral annular disc portion engaging the groove set forth for the axial location of the ring upon the piston.

6. In an internal combustion engine, the combination of a cylinder having walls of a relatively soft alloy, a non-contacting piston within the cylinder of similar alloy and provided with circumferential grooves, annular members of relatively hard material supported in the grooves, said annular members having a peripheral portion of a width greater than the width of said grooves, said peripheral portion forming a bearing and a closure between the piston and the cylinder walls.

7. In a device of the class described, in combination, a cylinder having walls of a relatively soft alloy, a piston of similar alloy within the cylinder and provided with a plurality of axially spaced apart circumferential grooves, annular members of a relatively hard material and of such form as to permit them being arranged in contiguous relation when located axially by the spaced apart grooves, said annular members adapted to provide a relatively broad bearing surface between the piston and the cylinder.

8. In an internal combustion engine, in combination, a cylinder of heat conducting material, a piston within the cylinder provided with axially spaced apart circumferential grooves and of such diameter as to provide a substantial clearance between the piston and the cylinder, annular members contiguously arranged in groups and partly disposed within the grooves and axially and radially extended on the periphery of the piston in a manner so as to form a substantially broad bearing and to form a seal between the piston and the cylinder.

9. In an internal combustion engine, a bearing between a piston and a cylinder comprising a plurality of annular members supported on said piston so as to move therewith and of an external diameter substantially greater than the diameter of said piston, said members being arranged in units of two or more, the members in each unit being in separated contiguous relation so as to provide a relatively broad bearing surface in contact with said cylinder.

10. In an internal combustion engine, the combination of a cylinder, a piston within the cylinder of substantially lesser diameter than the cylinder, annular members contiguously arranged in spaced apart groups and so formed in cross section as to provide a broad peripheral band portion thereon for contact with the piston, the outer face of said band portion having a sliding contact with the cylinder, inwardly extending portions integral with the band portion, and circumferential slots axially spaced apart formed on the piston in which said inwardly extending portions are disposed.

11. A piston bearing means for contact with a cylinder comprising, a piston provided with a plurality of axially spaced apart circumferential grooves, expandible ring members contiguously arranged in units and constituting the bearing means and located in the grooves, said ring members of such form that the ring of one groove abuts the ring of the adjacent groove in the same unit so as to substantially form in their combined relation two relatively broad sleeve portions about the piston.

12. In an internal combustion engine, the combination of a cylinder, a piston within the cylinder, a plurality of spaced apart sleeve portions on the piston adapted to act as a bearing between the piston and the cylinder, said sleeve portions formed of a plurality of expandible ring members arranged in groups and supported on the piston in contiguous relation with one another.

13. In an internal combustion engine, the combination of a cylinder and a piston both fabricated of aluminum alloy, said piston having a diameter substantially less than the interior of the cylinder so as to provide a space therebetween, and expandible bearing means comprising ring members fabricated of ferrous metal for supporting said piston with the cylinder and adapted to fill and seal said space.

14. The combination of a cylinder and a piston both fabricated of non-ferrous metal, said piston having a diameter substantially less than the interior of the cylinder so as to provide a space therebetween, and means comprising a plurality of ring members fabricated of ferrous metal supported on said piston so as to collectively form a relatively broad bearing between the piston and the cylinder.

Signed at Keyport in the county of Monmouth and State of New Jersey this 25th day of October A. D. 1923.

ROLAND CHILTON.
HAROLD H. YOUNG.